F. A. NEVEU.
RADIATOR.
APPLICATION FILED AUG. 18, 1919.
1,399,571. Patented Dec. 6, 1921.
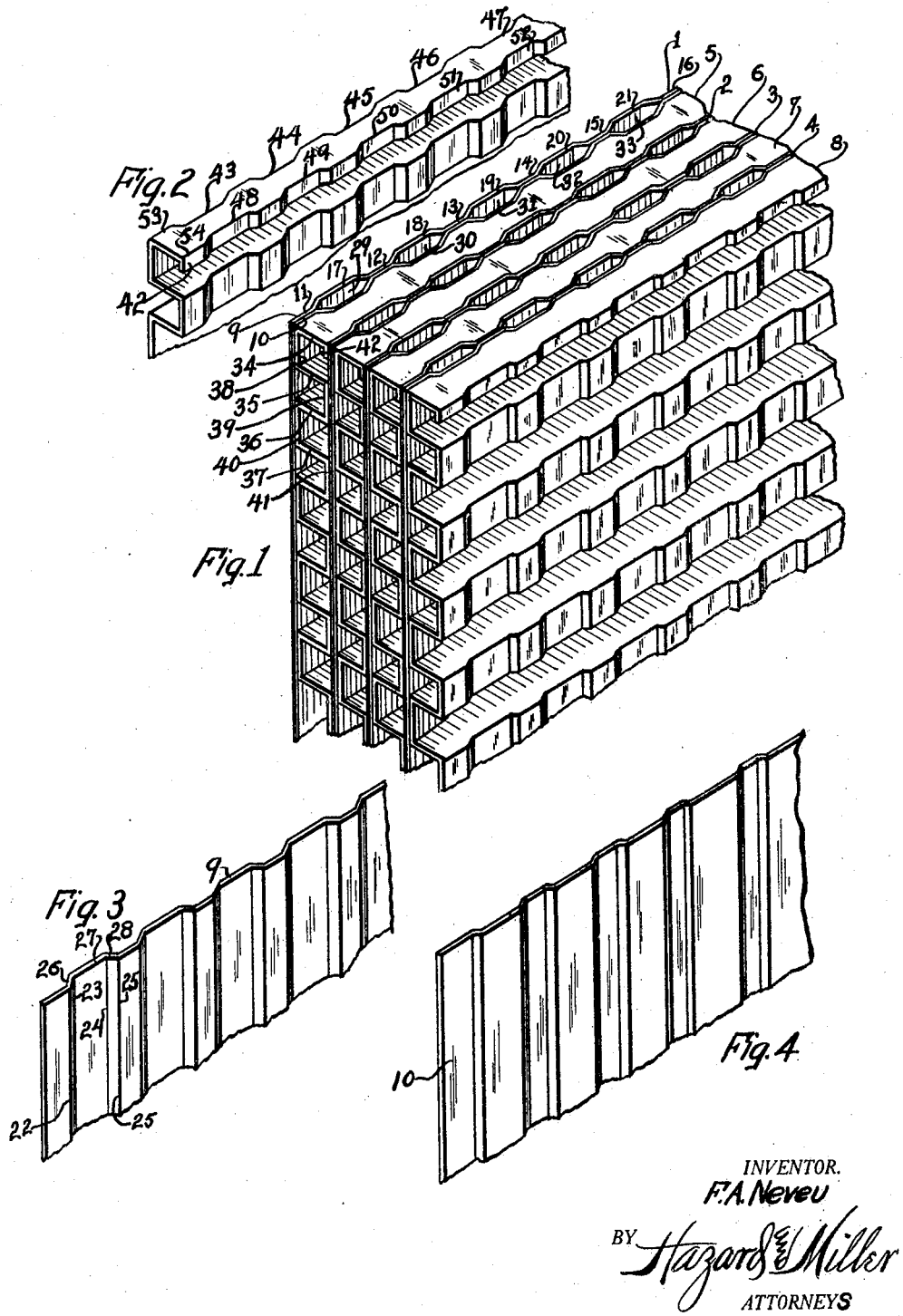
INVENTOR.
F. A. Neveu
BY Hazard & Miller
ATTORNEYS

UNITED STATES PATENT OFFICE.

FRANK A. NEVEU, OF LOS ANGELES, CALIFORNIA.

RADIATOR.

1,399,571.     Specification of Letters Patent.     Patented Dec. 6, 1921.

Application filed August 18, 1919. Serial No. 318,307.

*To all whom it may concern:*

Be it known that I, FRANK A. NEVEU, a citizen of the United States, residing at Los Angeles, in the county of Los Angeles and State of California, have invented new and useful Improvements in Radiators, of which the following is a specification.

My invention relates to radiators and consists of the novel features herein shown, described and claimed.

My object is to make an improved water and air cell construction.

Figure 1 is a fragmentary perspective showing a water and air cell construction for radiators embodying the principles of my invention.

Fig. 2 is a fragmentary perspective of the air cell member.

Fig. 3 is a fragmentary perspective of one half of the water cell member.

Fig. 4 is a fragmentary perspective of the other half of the water cell member.

Referring to Fig. 1, the water and air cell construction comprises the water cell members 1, 2, 3, 4 and so on arranged alternately with the air cell members 5, 6, 7, 8 and so on.

Each water cell member 1, 2, 3, 4 and so on comprises two plates 9 and 10. The plates 9 and 10 are substantially alike except that they are made right and left, or turned face to face. The plate 9 comprises flat spacing portions 11, 12, 13, 14, 15, 16 and so on and half water tube portions 17, 18, 19, 20, 21 and so on. In forming the spacing portions and water tube portions the flat plates are pressed on straight lines 22, 23, 24, 25 and so on.

The water tube portions extend from the line 22 to the line 25. The portion 26 between the line 22 and the line 23 is slightly inclined. The portion 27 between the line 23 and the line 24 is flat and parallel with the spacing portions, and the portion 28 between the line 24 and the line 25 is oppositely inclined relative to the portion 26. The two plates 9 and 10 fit together face to face so that the portions 27 are spaced apart to form the water tube spaces 29, 30, 31, 32, 33 and so on.

The air cell members 5, 6, 7, 8 and so on are substantially alike and each consists of a single piece of sheet metal bent and pressed to the desired form. Each plate is bent zigzag to form the horizontal walls 34, 35, 36, 37 and so on and the vertical walls 38, 39, 40, 41 and so on. The upper horizontal plate 34 has a downturned edge 42 and the lower horizontal plate has a corresponding upturned edge to finish the members.

The horizontal walls 34, 35, 36, 37 and so on are as flat as may be and the vertical walls 38, 39, 40, 41 and so on are arranged alternately at opposite sides of the horizontal walls, and the vertical walls are pressed to form seats 43, 44, 45, 46, 47 and so on on one side and corresponding seats 48, 49, 50, 51, 52 and so on on the other side and to form flat spaces 53 on one side and flat spaces 54 on the other side, said spaces 53 and 54 alternating with the seats.

The air cell members 5, 6, 7, 8 and so on are placed alternately between the water cell member 1, 2, 3, 4 and so on, and the water tube portions of the members 1, 2, 3, 4 and so on fit in the seats of the air cell members.

The construction thus formed is very light and at the same time very substantial, and it is only necessary to solder the water cell members and air cell members together along their outer edges all the way around.

Various changes may be made without departing from the spirit of my invention as claimed.

I claim:

1. In a radiator, a water and air cell construction comprising water cell members and air cell members arranged alternately, each water cell member comprising two pieces bent upon vertical lines and fitting together to form water tube portions, and the air cell members each comprising a spacing plate bent to form horizontal walls and vertical walls, the vertical walls at alternate sides of the horizontal walls being pressed to form seats for the water tube portions of the water cell members at the respective sides of the spacing plates.

2. In a radiator, a water and air cell construction comprising a water cell member including two plates bent outwardly on vertical lines to form water tubes, and a spacing plate bent to form flat horizontal walls and alternate vertical walls, the vertical walls, at alternate sides of the horizontal walls being pressed to form seats to receive the water tube portions of next adjacent water cell members.

In testimony whereof I have signed my name to this specification.

FRANK A. NEVEU.